US008667182B2

(12) United States Patent
Huang

(10) Patent No.: US 8,667,182 B2
(45) Date of Patent: Mar. 4, 2014

(54) USER LOCATING SYSTEM, METHOD AND SERVER IN PACKET-BASED NETWORK

(75) Inventor: Yong Huang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 1426 days.

(21) Appl. No.: 12/003,309

(22) Filed: Dec. 21, 2007

(65) Prior Publication Data

US 2008/0107096 A1 May 8, 2008

Related U.S. Application Data

(63) Continuation of application No. PCT/CN2006/001503, filed on Jun. 29, 2006.

(30) Foreign Application Priority Data

Jul. 1, 2005 (CN) .......................... 2005 1 0080323

(51) Int. Cl.
| | |
|---|---|
| G06F 15/16 | (2006.01) |
| H04W 24/00 | (2009.01) |
| H04B 7/00 | (2006.01) |
| H04L 29/08 | (2006.01) |
| H04L 12/28 | (2006.01) |
| H04L 29/12 | (2006.01) |

(52) U.S. Cl.
CPC ..... H04L 29/08657 (2013.01); *H04L 29/12037* (2013.01); *H04L 29/12103* (2013.01); *H04L 12/2834* (2013.01)
USPC ........... 709/249; 709/250; 709/219; 709/218; 370/401; 370/422; 455/456.1; 455/517

(58) Field of Classification Search
CPC .................. H04L 29/08657; H04L 29/12037; H04L 29/12103; H04L 12/2834; H04W 64/00
USPC .............. 370/310.2, 328, 338, 349, 352–358, 370/392, 389, 395.5; 709/217, 218, 219, 709/249, 250; 455/456.1, 517
See application file for complete search history.

(56) References Cited

U.S. PATENT DOCUMENTS 6,427,170 B1 * 7/2002 Sitaraman et al. ............ 709/226
6,636,498 B1 * 10/2003 Leung ........................... 370/338

(Continued)

FOREIGN PATENT DOCUMENTS

| CN | 1309491 | 8/2001 |
|---|---|---|
| CN | 1567894 A | 1/2005 |

(Continued)

OTHER PUBLICATIONS

Extended European Search Report for European Application No. 06753068.3 including supplementary European search report and European search opinion (Aug. 8, 2008).

(Continued)

*Primary Examiner* — Joseph E Avellino
*Assistant Examiner* — Aftab Nasir Khan
(74) *Attorney, Agent, or Firm* — Huawei Technologies Co., Ltd.

(57) ABSTRACT

A user locating system, method and server in a Packet-based network. A plurality of management regions divided by terrains are included, and each of the management regions includes: an address management server adapted to collect and bind communication addresses and user identifiers of all network users in the management region, and to send information of the binding to a region locating server in the present management region; and a region locating server adapted to store and update the information of the binding of the user identifiers and the communication addresses of all the network users in the present management region, to send the information of the binding to a inquirer dependent upon a received inquiry request, and to send information of binding of a user identifier and a communication address found not belonging to the present management region to a home management region of the user.

9 Claims, 3 Drawing Sheets

(56) References Cited

U.S. PATENT DOCUMENTS

| | | | |
|---|---|---|---|
| 7,184,418 B1* | 2/2007 | Baba et al. | 370/331 |
| 7,496,071 B2* | 2/2009 | Yamada et al. | 370/331 |
| 7,672,288 B1* | 3/2010 | Iartym | 370/349 |
| 8,036,182 B2* | 10/2011 | Takeda et al. | 370/338 |
| 2001/0015966 A1 | 8/2001 | Casati | |
| 2003/0176188 A1 | 9/2003 | O'Neill | |
| 2004/0141477 A1 | 7/2004 | Xu et al. | |
| 2004/0214576 A1* | 10/2004 | Myers et al. | 455/445 |
| 2005/0063350 A1* | 3/2005 | Choudhury et al. | 370/338 |
| 2005/0207382 A1* | 9/2005 | Hirashima et al. | 370/338 |
| 2005/0237962 A1* | 10/2005 | Upp et al. | 370/313 |
| 2006/0062228 A1* | 3/2006 | Ota et al. | 370/401 |
| 2006/0120382 A1* | 6/2006 | Thubert et al. | 370/395.52 |
| 2008/0117884 A1* | 5/2008 | Ishii et al. | 370/338 |

FOREIGN PATENT DOCUMENTS

| | | |
|---|---|---|
| CN | 1870658 B | 7/2010 |
| EP | 1 376 972 A2 | 1/2004 |
| KR | 2001-0088233 A | 9/2001 |
| WO | WO-03/037001 A1 | 5/2003 |
| WO | WO-2005/046143 A1 | 5/2005 |

OTHER PUBLICATIONS

Gustafsson, et al., "Mobile IP Regional Registration, draft-ieff-mobileip-reg-tunnel-03.txt", Mobile IP Working Group, Internet Draft, pp. i-33, (Jul. 13, 2000).

International Search Report from the Chinese Patent Office for International Application No. PCT/CN2006/001503.

PCT Written Opinion of the International Searching Authority mailed Nov. 9, 2006, issued in related Application No. PCT/CN2006/001503, Huawei Technologies Co., Ltd. (3 pages).

J. Rosenberg, et al., "SIP: Session Initiation Protocol", Network Working Group, Standards Track, RFC 3261, Jun. 2002 (13 pages).

EPO Examination Report mailed Jun. 1, 2012, issued in related European Application No. EP 06753068.3, Huawei Technologies Co., Ltd. (7 pages).

R. Droms, et al., Dynamic Host Configuration Protocol for IPv6 (DHCPv6), Network Working Group, Standards Track, RFC 3315, Jul. 2003 (101 pages).

S. Thomson, et al., "IPv6 Stateless Address Autoconfiguration", Network Working Group, Standards Track, RFC 2462, Dec. 1998 (25 pages).

D. Johnson, et al., "Mobility Support in IPv6", Network Working Group, Standards Track, RFC 3775, Jun. 2004 (197 pages).

T. Narten, et al., Neighbor Discovery for IP Version 6 (IPv6), Network Working Group, Standards Track, RFC 2461, Dec. 1998 (93 pages).

R. Stewart, et al., "Stream Control Transmission Protocol (SCTP) Dynamic Address Reconfiguration", Network Working Group, Standards Track, RFC 5061, Sep. 2007 (49 pages).

R. Stewart, et al., "Stream Control Transmission Protocol (SCTP) Dynamic Address Reconfiguration", Network Working Group, Internet-Draft, Feb. 20,2005 (36 pages).

R. Stewart, et al., "Stream Control Transmission Protocol", Network Working Group, Standards Track, RFC 2960, Oct. 2000 (134 pages).

* cited by examiner

USER LOCATING SYSTEM, METHOD AND SERVER IN PACKET-BASED NETWORK

CROSS-REFERENCE TO RELATED APPLICATIONS

This application is a continuation of International Application NO. PCT/CN2006/001503, filed Jun. 29, 2006, which claims the priority of Chinese Application No. 200510080323.7, filed Jul. 1, 2005, the content of both of which is incorporated herein by reference.

FIELD OF THE INVENTION

The present invention relates to the communication field and in particular to a user locating system, method and server in a Packet-based network.

BACKGROUND OF THE INVENTION

In the next generation of networks, there is a need for a communication node to move frequently, and when the communication node moves, its address is typically changed. During communication with a mobile communication node, the communication node has to be located. In other words, an identifier of the communication node, such as a Fully Qualified Domain Name (FQDN) or an identification address, has to be converted into a network address which is accessible through communication by the present communication node.

An existing method for locating a mobile communication node is locating by mobile Internet Protocol (IP). This method is described briefly here with respect to the mobile IPv6.

Based upon technologies supporting node mobility in the IPv4, the method proposes technologies supporting communication node mobility in an IPv6 network.

FIG. 1 illustrates a schematic diagram of a principle of the method. A mobile node 110 moves from a home network to a foreign network. The following operations will be performed during its moving.

1. The mobile node 110 obtains in the foreign network a mobile address through an address configuration mechanism.

2. The mobile node 110 sends an address binding message to a home agent 120, registering the newly obtained mobile address (a primary Care-of Address) with the home agent 120 of a home link. The home agent 120 makes the mobile address newly obtained by the mobile node 110 to be corresponded to a local address of the mobile node 110 and stores the correspondence, thereby accomplishing a binding registration function for the node, and then returns in response a "Binding Acknowledgement" message to the mobile node 110.

The following operations will be performed when a node 130 is to communication with the mobile node 110.

1. The node 130 sends a data packet, which is to be sent to the mobile node 110, to the home agent 120.

2. The home agent 120 forwards the data packet to the mobile node 110 through an extended routing head of the data packet.

3. The mobile node 110 sends to the node 130 the address binding message informing the node 130 of its new address.

4. If the node 130 supports the mechanism of the method, it creates a binding buffer dependent upon the received new address of the mobile node 110, and conducts subsequent communication directly with the mobile node 110 by use of information of this buffer. Otherwise, it keeps on sending a subsequent packet to the home address of the mobile node 110, and the home agent 120 over the home link of the mobile node 110 relays the data to the current primary Care-of Address of the mobile node 110.

A node in communication with a mobile node is referred to as a communication node of the mobile node, which may be a fixed node or a mobile node. The mobile node can provide its communication node with information of its current location.

There are two modes for communication between a mobile node and a communication node.

The first mode is a bidirectional tunnel mode.

This mode is available when the mobile node has not registered current binding information with the communication node. In this communication mode, a data packet sent from the communication node to the mobile node is routed to a home agent of the mobile node, and then reaches the mobile node through a tunnel. Data packet sent from the mobile node to the communication node is passed to the home agent through the tunnel, and the home agent routes the data packet to the communication node in a normal way. In this mode, the home agent intercepts any data packet sent to a home address of the mobile node in an agent neighbor way. Each intercepted data packet is tunneled to a primary Care-of Address of the mobile node. The bidirectional tunnel in this mode is implemented with IPv6 encapsulation.

The second mode is an optimized routing mode.

This mode requires the mobile node to register its current binding information with the communication node. In this communication mode, data packet sent from the communication node to the mobile node is routed directly to the primary Care-of Address of the mobile node. When the communication node is to send any data packet to an IPv6 destination, a binding buffered entry of the destination of the data packet will be detected. If the binding buffered entry of the destination is found, the communication node adds a new IPv6 routing head type, sets a destination address in an IP head as the primary Care-of Address of the mobile node designated in the binding buffered entry, and routes the data packet to the mobile node through the shortest path. This mode reduces congestion of the home agent and the home link of the mobile node, and also reduces an influence of a possible transmission failure on the home agent or the home link.

As can be seen from the above, a key of the locating method of the mobile IPv6 lies in that the home agent makes the primary Care-of Address be bound with the home address of the mobile node and stores the bonding upon reception of a binding update message, including the primary Care-of Address, sent by the mobile node from a new network. A change of an address of the mobile node is transparent to the communication node. In the optimized routing mode, the mobile node sends the binding update message to the communication node, and makes the home address of the mobile node to be corresponded to the current primary Care-of Address by use of a destination binding buffer in the communication node.

The above locating method of the mobile IPv6 is disadvantageous in that the method requires participation of the home agent, and a problem of triangular routing occurs when adopting the bidirectional tunnel mode. In this method, the home agent not only enables the locating of the communication node, but also participates in the forwarding of the data. The requirements on network devices are relatively strict. Further, a home agent is required to be deployed over each link, and all mobile terminals are required to implement mobile IP technologies, the requirements of which to the terminals are relatively strict.

Another existing method for locating a mobile communication node is registration locating of the Session Initiation Protocol (SIP).

According to this method, the SIP protocol is firstly required to be implemented in both a communication node and a mobile node. When the communication node is to communication with the mobile node, the communication node registers with an SIP server in a new network of the mobile node, and this SIP registration server can find a home domain of the mobile node through an SIP Universal Resource Identifier (SIP URI) of a user, and informs the SIP server of the home domain of the communication node about network parameters of the mobile node. Therefore, the communication node finds the network parameters of the mobile node through inquiring about the SIP server of its user home domain, and determines current location of the mobile node dependent upon the acquired network address parameters.

This method is disadvantageous in that the SIP protocol is a high level protocol developed for transmission of a media stream in a Packet-based network. Although the use of the SIP protocol can implement locating of the user, it is required that relevant network elements with architecture of the SIP protocol must be deployed in the network. The SIP protocol is required to be implemented in all network nodes, which may be unreasonable for many terminals which do not rely on the SIP protocol for communication. This method leads to both a high cost of network deployment and strict requirements on the communication nodes.

SUMMARY OF THE INVENTION

A user locating system and method in a Packet-based network is provided, so that a user locating mechanism independent of service and application can be provided for the Packet-based network, and a mobile user can be located in the entire Packet-based network.

Correspondingly, an auto-detect address locating server, a region locating server and a centralized address management server in a Packet-based network is further provided.

A user locating system in a Packet-based network includes a plurality of management regions, each of the management regions includes:

an address management server adapted to collect communication addresses and user identifiers of all network users in the management region, and to send the collected communication addresses and user identifiers to a region locating server in the present management region; and a region locating server adapted to store and update binding information of the user identifiers and the communication addresses of all the network users in the present management region, and to send the binding information to an inquirer upon reception of an inquiry request.

The region locating server is further adapted to send binding information of a user identifier and a communication address, which is found not belonging to the present management region, to a home management region of the user.

The address management server includes:

a centralized address management server adapted to allocate centrally a communication address to a network user in the present management region, to bind a user identifier and the communication address of the user, and to store and send information of the binding to the region locating server in the present management region;

and/or an auto-detect address locating server adapted to collect a user identifier and a communication address of a network user in the present management region over a link with an auto-detect network address, to bind the user identifier and the communication address, and to store and send information of the binding to the region locating server in the present management region.

The user locating system in a Packet-based network further includes:

an interface between the Packet-based network and the region locating server, through which the Packet-based network sends a user identifier to the region locating server and through which the region locating server returns a corresponding user address to the Packet-based network;

through which the Packet-based network sends information of a user identifier and corresponding current communication address of a user belonging to the present region to the region locating server; and through which the region locating server sends information of a user identifier and corresponding current communication address of a user found in the present region not belonging to the present region to a home domain of the user; and an interface between the centralized address management server and the region locating server, through which the centralized address management server sends a communication address allocated to a user and a user identifier to the region locating server; and through which the region locating server sends network parameters to the centralized address management server;

and/or an interface between the auto-detect address locating server and the region locating server, through which the auto-detect address locating server sends a user configured address and user identifier information to the region locating server, and through which the region locating server sends network parameters to the auto-detect address locating server.

A user locating method in a Packet-based network based upon the above user locating system includes:

collecting information of a communication address and corresponding user identifier of a user within an administrative region, and passing the collected information to a region locating server within the same region; and storing, by the region locating server, the received information, maintaining the stored information, and locating the user dependent upon the information.

The collecting of the information includes:

allocating centrally, by each centralized address management server, communication addresses for all users within an administrative region, and recording information of the user identifier reported by the user when applying for an address;

storing, by the centralized address management server, information of the communication address allocated to the user and the recorded corresponding user identifier;

and/or collecting, by each auto-detect address locating server, information of the communication address available to the user over and the corresponding user identifier;

storing, by the auto-detect address locating server, the collected information of the communication address and the corresponding user identifier of the user.

The maintaining of the stored information and locating of the user dependent upon the information includes:

maintaining, by the region locating server, information of binding of the communication address and a user identifier of the user dependent upon the received information of the communication address and the corresponding user identifier of the user; and receiving, by the region locating server, a request for inquiring about a communication address of a user from inside or outside of the present management region, determining the current communication address of the user from its stored information dependent upon information of the user identifier in the request, and returning the communication address to an inquirer.

The maintaining of information of binding of the communication address and a user identifier of the user includes:

determining, by the region locating server, whether the user belongs to the present management region dependent upon the received information of the user identifier, and if yes, updating the information of binding of the communication address and the user identifier of the user dependent upon the received information; otherwise, sending, by the region locating server, the information of binding of the communication address and the user identifier of the user to a region locating server of a region to which the user belongs; and updating, by the region locating server of the region to which the user belongs, the information of binding of the communication address and the user identifier of the user dependent upon the received information.

A method for collecting user locating information includes:

sending a neighbor request message carrying information of a user identifier of a user;

performing Duplicated Address Detection over an IPv6 link with stateless address automatic configuration, and collecting corresponding information of the user identifier and a communication address of the user.

The user identifier includes a Fully Qualified Domain Name or an IPv6 address or other globally unique identifier of the user.

The collecting of corresponding information of the user identifier and a communication address of the user includes:

collecting the neighbor request message carrying the user identifier of the user over the IPv6 link, and extracting and recording the user identifier and a test address in the message;

initiating timing with a predetermined duration, and deleting the extracted record if a neighbor notification message sent from another user reporting a confliction of the test address is received before the timing with the predetermined duration expires;

binding the recorded user identifier and test address of the user if no neighbor notification message sent from another user reporting a confliction of the test address is received after the timing with the predetermined duration expires, thereby obtaining the corresponding information of the user identifier and the communication address of the user.

The timing with the predetermined duration may be implemented with a timer or a counter.

An auto-detect address server in a Packet-based network includes:

a snooping unit adapted to collect a neighbor request message carrying a user identifier of a user and a neighbor notification message over a link, to extract the user identifier and a test address in the neighbor request message, to snoop into the neighbor notification message reporting a confliction of the test address, and to send the extracted information to a locating information management unit and request for updating record information;

a locating information management unit adapted to receive a request from the snooping unit, to maintain information of the user identifier and the test address, and to bind and send the obtained user identifier and address to a communication unit;

a timing unit adapted to initiate timing with a predetermined duration; and a communication unit adapted to send the user identifier and address sent form the locating information management unit outward to a region locating server, the locating information management unit updates a status of the user identifier and the test address to indicate an obtained binding, and sends information of the binding to the region locating server through the communication unit, if the snooping unit receives no neighbor notification message sent from another user reporting a confliction of the test address after the timing with the predetermined duration expires, and the locating information management unit deletes a pair of the user identifier and the test address from a maintained information table if the snooping unit receives the neighbor notification message sent from another user reporting a confliction of the test address before the timing with the predetermined duration expires.

An auto-detect address server in a Packet-based network includes:

a request message snooping unit adapted to collect a neighbor request message carrying a user identifier of a user over a link;

an information extracting unit adapted to extract and record the user identifier and a test address in the neighbor request message;

a timing unit adapted to initiate timing with a predetermined duration;

a neighbor notification message snooping unit adapted to collect a neighbor notification message sent by another user over the link reporting a confliction of the test address; and an information binding unit adapted to bind the recorded user identifier and test address of the user if no neighbor notification message sent from another user reporting a confliction of the test address is received after the timing with the predetermined duration expires, thereby obtaining corresponding information of the user identifier and the communication address of the user.

The server further includes a record deleting unit adapted to delete the extracted record if the neighbor notification message snooping unit receives the neighbor notification message sent from another user reporting a confliction of the test address before the timing with the predetermined duration expires.

A region locating server in a Packet-based network includes:

an information storage and update unit adapted to store and update information of binding of user identifiers and communication addresses of all network users belonging to a management region; and an information inquiring unit adapted to send the corresponding information of binding to an inquirer upon reception of an inquiry request.

The server further includes an information sending unit adapted to send the information of binding of a user identifier and a communication address found not belonging to the present management region to a home management region of the network user.

A centralized address management server in a Packet-based network includes:

a communication address allocation unit adapted to allocate centrally communication address for all network users within an administrative region and to record information of a user identifier reported by a network user when applying for an address;

an information storage unit adapted to bind and store information of the communication address allocated to the network user and the recorded corresponding user identifier; and an information passing unit adapted to pass the information of binding to a region locating server in the network.

BRIEF DESCRIPTIONS OF THE DRAWINGS

DETAILED DESCRIPTIONS OF THE EMBODIMENTS

The invention provides a user locating system and method in a Packet-based network. An essence of the invention is in that a centralized address management server, an auto-detect address locating server and a region locating server are provided in a management region of a Packet-based network, and the provided servers collect and maintain information of binding of a user identifier and a communication address of a user.

Figure 1:
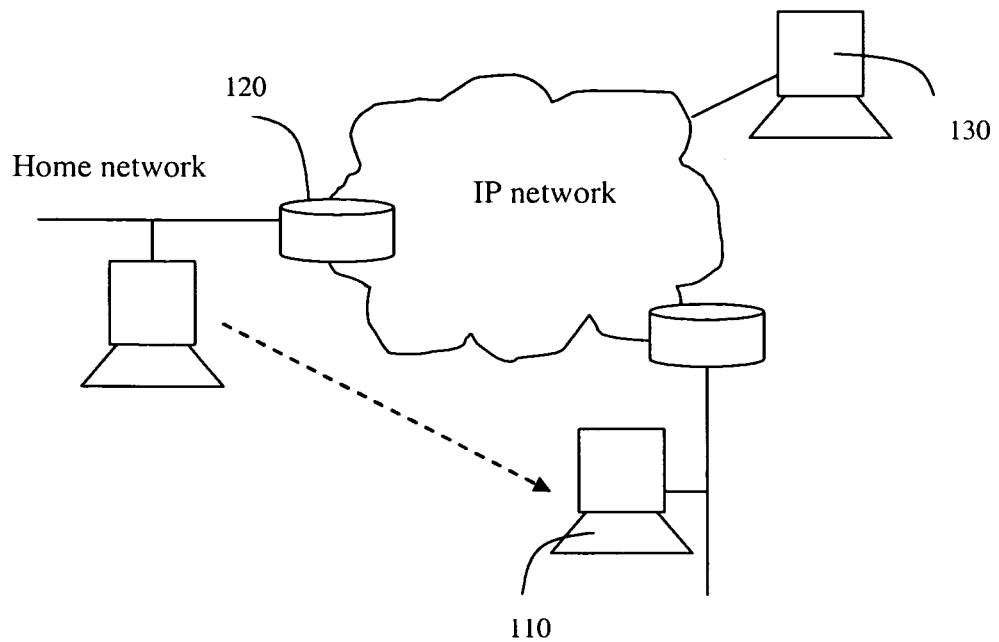
FIG. 1 is a schematic diagram of a principle of a locating method of the mobile IPv6 in the prior art.
Figure 2:
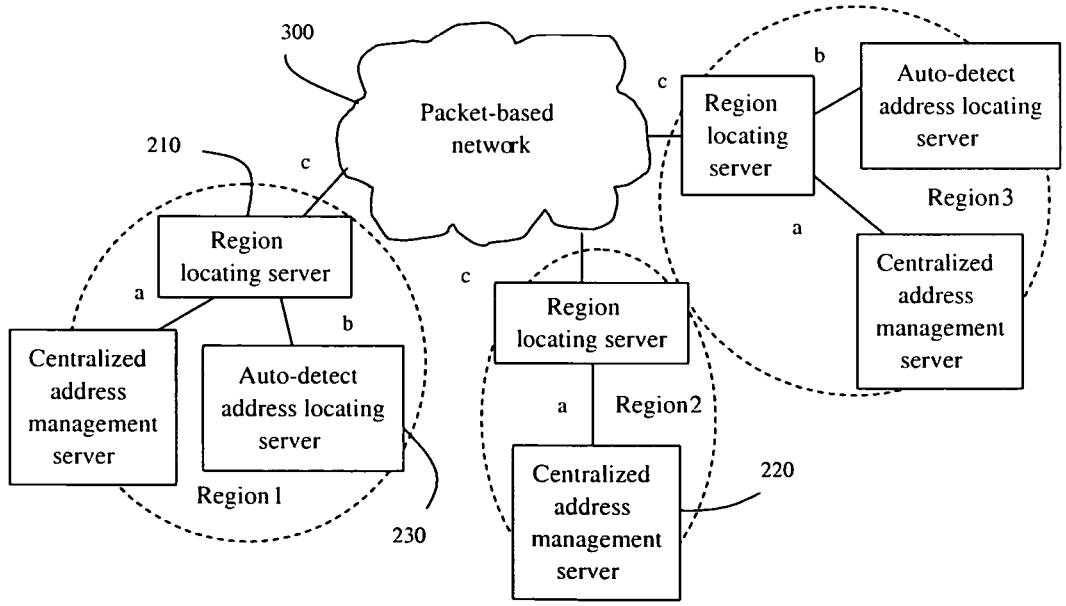
FIG. 2 is a schematic diagram of an implementation framework of a system according to embodiments of the present invention.
Figure 3:
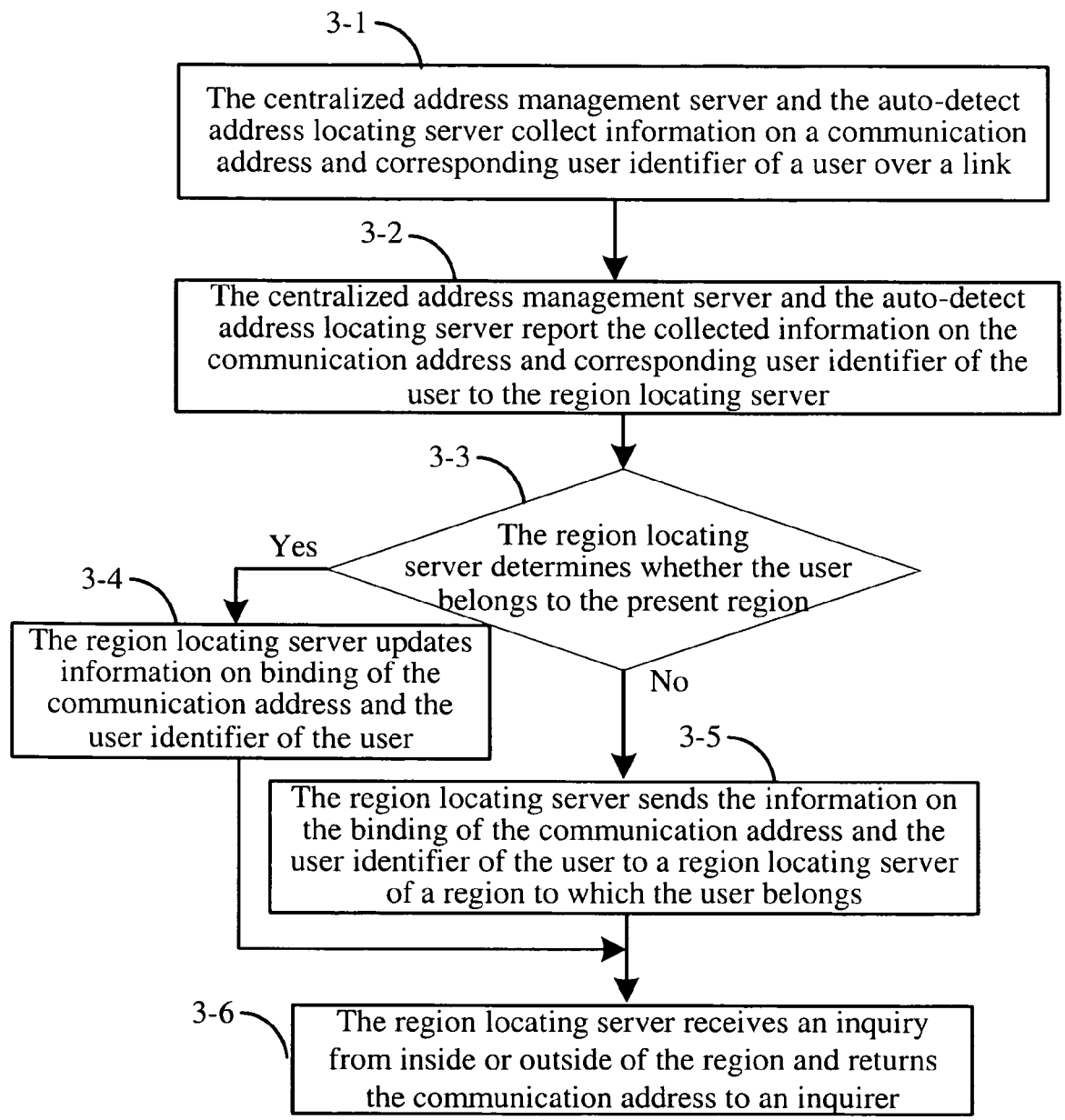
FIG. 3 is a flow chart of a user locating method in a Packet-based network according to embodiments of the present invention.
Figure 4:
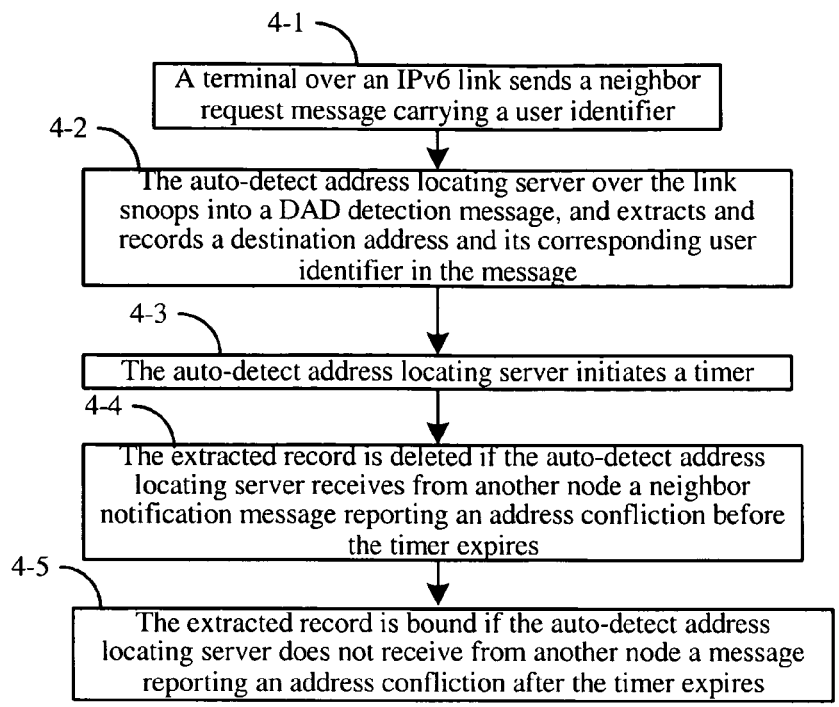
FIG. 4 is a flow chart of a method for collecting corresponding information of a user identifier and a communication address over an IPv6 link with stateless address automatic configuration according to embodiments of the present invention.

The embodiment of the invention is described in detail as follows with reference to the drawings. FIG. 2 illustrates a schematic diagram of an implementation framework of a system according to embodiments of the present invention.

The implementation framework primarily includes three types of server, a region locating sever 210, a centralized address management server 220 and an auto-detect address locating server 230, and three types of interface, an interface a, an interface b and an interface c.

For better understanding of the invention, concepts of a user identifier and a communication address is firstly explained.

A user identifier can be a globally unique identifier including but not limited to an IP address or FQDN of a user. Further, the user identifier may be required to be authenticated at an authentication server, and therefore can also refer to an index value by which the globally unique identifier of the user can be indexed uniquely on the region locating server.

A communication address refers to a code which can identify a network terminal in a network and by which a communication contact can be established with this network terminal. The communication address includes an IP address of the network terminal in an IP network, a telephone number of the user, etc.

Functions of the servers and interfaces in the implementation framework of the system according to embodiments of the present invention are described below respectively.

The region locating server 210 is adapted to:

1. Receive information of binding of a user identifier and a communication address reported respectively from the centralized address management server 220 and the auto-detect address server 230, and store the information of binding.

2. Receive a request for inquiring about the information of binding from a communication node in the present region. This request is for locating a mobile node in the region.

3. Receive a location inquiry from a Packet-based network, i.e. an inquiry for locating a mobile node belonging to the present region from a communication node outside the present region. For instance, an identifier and relevant source verification information of a user is introduced from the Packet-based network, and the region locating server 210 returns a current available communication address and relevant parameters of the user.

4. Receive information of a user identifier and current communication address of a user belonging to the present region as well as relevant source verification information introduced from another region locating server in a Packet-based network. The region locating server 210 verifies the received information, and binds and stores information of the user identifier and the current available communication address.

5. Pass information of a user identifier and its corresponding communication address of a user found in the present region not belonging to the present region, to a home domain of the user.

The centralized address management server 220 is adapted to:

1. Allocate centrally addresses to all network users in the present region.

2. Collect information of a user identifier sent by a user when applying for an address, and bind the user identifier and an address allocated to the user, thereby forming information of the binding for the user, and store and send the information of the binding to the region locating server 210.

There may be a plurality of centralized address management servers 220 in a region. In an IP network, the centralized address management server 220 can be implemented through an extension of a Dynamic Host Configuration Protocol (DHCP) server. This extension requires a user to carry his identifier when applying for an address, and the server binds the identifier and the address of the user.

The auto-detect address locating server 230 is adapted to collect a user address and a user identifier over a link with an auto-detect network address and to report collected information of binding of the user address and the user identifier to the region locating server 210.

The user self-definition of an address refers to an address allocation method in which no centralized address allocation unit allocates centrally addresses and instead a user self-defines an address so as to ensure no confliction of addresses between users. A typical application of this address allocation method includes an IPv6 link implementing stateless address automatic configuration.

The auto-detect address locating server 230 can also obtain information of a user identifier through a specific protocol or through an extension of an existing protocol. Then, the server binds the obtained address information and identifier information of the user, thereby forming information of the binding for the user, and stores and sends the information of the binding to the region locating server 210.

There may be a plurality of or no auto-detect address locating server 230 in a region. The auto-detect address locating server 230 can be implemented with a router over a link, and can also be implemented with dedicated provision of a server over a link.

The Interface a:

The interface a is an interface between the centralized address management server 220 and the region locating server 210. Information transported from the centralized address management server 220 to the region locating server 210 via the interface a includes a communication address allocated to a user, a user identifier and other assistant information. Information transported from the region locating server 210 to the centralized address management server 220 primarily includes some network parameters, such as, as an example in an IP network, a Domain Name System (DNS) server address, etc.

The Interface b:

The interface b is an interface between the auto-detect address locating server 230 and the region locating server 210. Information transported from the auto-detect address locating server 230 to the region locating server 210 via the interface b includes a user configured address and a user identifier. Information transported from the region locating server 210 to the auto-detect address locating server 230 primarily includes some network parameters. When implementing address autonomic configuration, a user can also acquire these network parameters from the centralized address management server 220, and therefore the information transported from the region locating server 210 to the auto-detect address locating server 230 is optional.

The Interface c:

The interface c is an interface between a Packet-based network 300 and the region locating server 210, and primarily implements the following functions.

1. The Packet-based network 300 sends information of a user identifier and relevant verification to the region locating server 210, and the region locating server 210 returns a corresponding user address to the Packet-based network 300.

2. The Packet-based network 300 sends to the region locating server 210 information of a user identifier and its corresponding current communication address of a user belonging to the present region, and the region locating server 210 binds and stores the information.

3. The region locating server 210 passes to a home domain of a user via the interface c information of a user identifier and its corresponding current communication address of the user found in the present region not belonging to the present region.

In accordance with the above user locating system in a Packet-based network, the invention proposes a user locating method in a Packet-based network including the following blocks.

Block 3-1: The centralized address management server and the auto-detect address locating server collect information of a communication address and corresponding user identifier of a user over a link.

In each of management regions divided by terrains, one or more centralized address management servers or auto-detect address locating servers or both can be included.

Each centralized address management server allocates centrally communication address to all users within an administrative region, and also records information of a user identifier reported by a user when applying for an address. The centralized address management server stores information of the communication address allocated to the user and the corresponding user identifier.

Each auto-detect address locating server collects information of a communication address available to a user and corresponding identifier of the user within the administrative region. A collection method can be a method of passive perception by the auto-detect address locating server, and can also be a method of collection in its own initiative. For instance, a collection method for an IPv6 link with stateless address automatic configuration will be described below. The auto-detect address locating server stores the collected information of the communication address and corresponding user identifier of the user.

Block 3-2: The centralized address management server and the auto-detect address locating server report the collected information of the communication address and corresponding user identifier of the user to a region locating server.

The centralized address management server and the auto-detect address locating server report the collected information of the communication address and corresponding user identifier of the user to the region locating server.

Block 3-3: The region locating server determines whether the user belongs to the present region.

After receiving the information of the communication address and the corresponding user identifier of the user reported from the centralized address management server and the auto-detect address locating server, the region locating server determines whether the user belongs to the present region, and if yes, the flow goes to Block 3-4; otherwise, the flow goes to Block 3-5.

Block 3-4: The region locating server updates information of binding of the communication address and the user identifier of the user.

If the user belongs to the present management region, the region locating server updates the information of the binding of the communication address and the user identifier of the user dependent upon the received information.

Block 3-5: The region locating server sends the information of the binding of the communication address and the user identifier of the user to a region locating server of a region to which the user belongs.

If the user does not belong to the present management region, the region locating server sends the received information of the binding of the communication address and the user identifier of the user to a region locating server of a region to which the user belongs, and the region locating server of the region to which the user belongs updates the information of the binding of the communication address and the user identifier of the user dependent upon the received information.

Also, the region locating server receives an inquiry from inside or outside of the region, and returns a communication address to an inquirer.

The region locating server can receive a request for inquiry about a communication address of a user from inside or outside of the present management region. An inquirer can send to the region locating server a message carrying information of a user identifier, and dependent upon the information of the user identifier, the region locating server searches in the locally stored information of the binding of the communication address and the user identifier of the user for a current communication address of the user, and returns the communication address to the inquirer, thereby accomplishing locating of a mobile or nomadic user.

With respect to the above auto-detect address locating server, the invention also proposes a method for collecting corresponding information of a user identifier and a communication address of a user over an IPv6 link with stateless address automatic configuration, including the following blocks.

Block 4-1: A terminal over an IPv6 link sends a neighbor request message carrying a user identifier.

In order to verify uniqueness of a test address, a terminal over an IPv6 link sends a neighbor request message carrying a user identifier to perform Duplicated Address Detection (DAD). Dependent upon the neighbor request message, it can be detected whether any other node on the link has used this test address.

Block 4-2: The auto-detect address locating server over the link snoops into a DAD detection message, and extracts and records a destination address and its corresponding user identifier in the message.

The auto-detect address locating server over the link joins a requested node multicast group. In other words, this server receives all data packets with a prefix of ff02::1:ff00:0/104 to snoop into a DAD detection message from the data packets. The auto-detect address locating server also joins a full node multicast group ff02::1.

After snooping into a DAD detection message, the auto-detect address locating server extracts information of a destination address and the carried user identifier from this DAD detection message, and records and stores the extracted information.

Block 4-3: The auto-detect address locating server initiates a timer.

The auto-detect address locating server initiates a timer after recording and storing the extracted information, and a timing duration of the timer is the longest DAD detection expiration duration for the link.

Block 4-4: The extracted record is deleted if the auto-detect address locating server receives from another node a neighbor notification message reporting an address confliction before the timer expires.

If there is already another node over the IPv6 link, which has used the destination address carried in the DAD detection message, that node may respond by sending a neighbor notification message reporting an address confliction. The source IP address of that message is a uni-cast address of that node, and the destination address of that message is the full node address ff02::1 over the link. After receiving that message, the node implementing the DAD detection terminates the operation of automatic configuration. In this case, the host is required to be configured manually.

If the auto-detect address locating server receives from another node a message reporting an address confliction before the initiated timer expires, the extracted record is deleted.

Block 4-5: The extracted record is bound if the auto-detect address locating server does not receive from another node a message reporting an address confliction after the timer expires.

If the auto-detect address locating server does not receive from another node a message reporting an address confliction after the timer expires, the extracted destination address is determined as the communication address of the user, and binding of this communication address and the corresponding user identifier is performed.

After actions in the above blocks have been performed, the auto-detect address locating server of the link may acquire the information of the binding of the user identifier and the communication address of the user over the IPv6 link.

Figure 5:
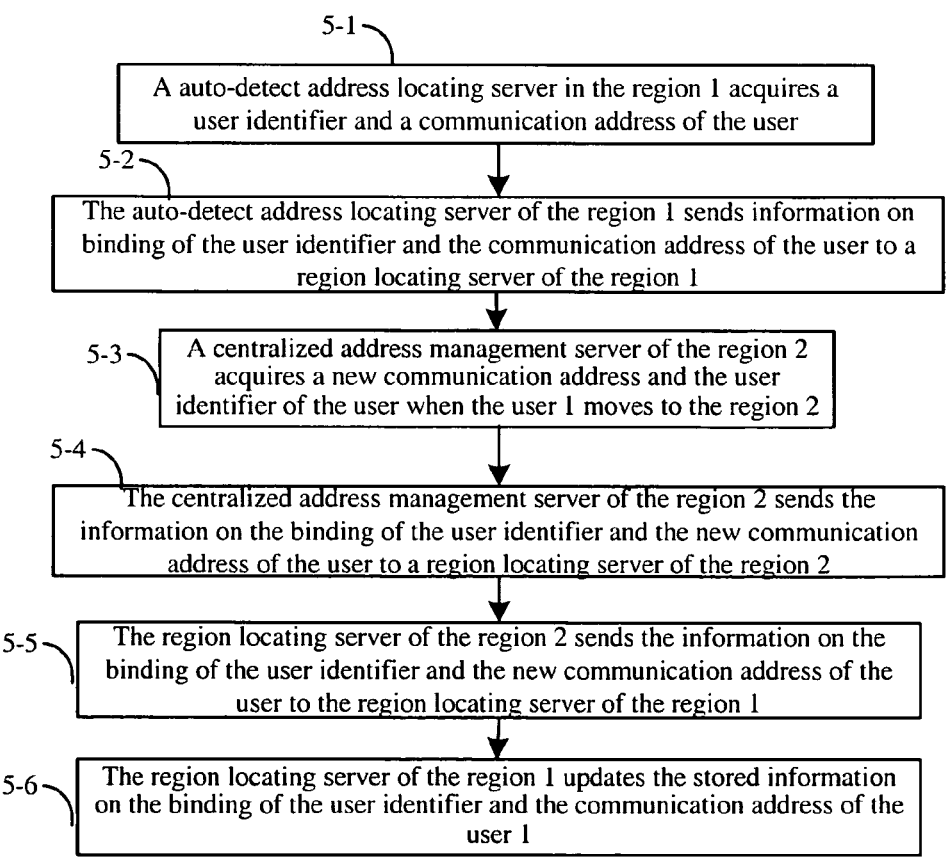
FIG. 5 is a flow chart of a particular locating processing procedure of a system according to embodiments of the present invention.

A particular locating processing procedure of a system according to embodiments of the present invention will be described below by way of an example. It is assumed that in the Packet-based network shown in FIG. 2, a user 1 (not shown) moves from a region 1 to a region 2. This user has an access to an IPv6 link with stateless address automatic configuration in the region 1, and has an access to a wireless access link with DHCP address centralized configuration in the region 2. During moving of the user from the region 1 to the region 2, a flow chart of the particular locating processing procedure of a system according to embodiments of the present invention is as illustrated in FIG. 5, including the following blocks.

Block 5-1: An auto-detect address locating server in the region 1 acquires a user identifier and a communication address of the user.

It is assumed that the user identifier of the user 1 is user1@domain1 belonging to the region 1, and this user has an access to an IPv6 link with stateless address automatic configuration through a fixed terminal in the region 1. In accordance with the above method for collecting corresponding information of a user identifier and a communication address of a user in an IPv6 link with stateless address automatic configuration, the auto-detect address locating server of the region 1 acquires a communication address IP1 and the user identifier configured automatically by the user over the link.

Block 5-2: The auto-detect address locating server of the region 1 sends information of binding of the user identifier and the communication address of the user to a region locating server of the region 1.

After acquiring the user identifier and the communication address of the user 1 over the IPv6 link, the auto-detect address locating server of the region 1 binds the user identifier and the communication address, and sends information of binding (user1@domain1, IP1) to a region locating server of the region 1 via the interface b.

Block 5-3: A centralized address management server of the region 2 acquires a new communication address and the user identifier of the user when the user 1 moves to the region 2.

When the user 1 moves from the region 1 to the region 2, the user has an access to the link through a mobile terminal in a wireless access way in the region 2, and a router over the link informs in an RA message the user that the address configuration is to be performed with DHCP. Therefore, the user inputs his user identifier into the mobile terminal, and the mobile terminal sends the user identifier user1@domain1 of the user to a DHCP server of the region 2 whiling applying the DHCP server of the region 2 for an IP address. The DHCP server of the region 2 assigns the user with a new IP address IP2, i.e. a new communication address of the user 1.

Block 5-4: The centralized address management server of the region 2 sends the information of the binding of the user identifier and the new communication address of the user to a region locating server of the region 2.

After assigning the user 1 with the new communication address IP2, the DHCP server binds the new communication address and the user identifier of the user, and sends information of the binding (user1@domain1, IP2) to the region locating server of the region 2.

Block 5-5: The region locating server of the region 2 sends the information of the binding of the user identifier and the new communication address of the user to the region locating server of the region 1.

After receiving the information of the binding (user1@domain1, IP2), the region locating server of the region 2 discovers that the domain to which the user corresponding to the user identifier user1@domain1 belongs is in the region 1, and therefore finds the region locating server of the region 1 in a certain way, and sends the information of the binding (user1@domain1, IP2) to the region locating server of the region 1.

Block 5-6: The region locating server of the region 1 updates the stored information of the binding of the user identifier and the communication address of the user 1.

After receiving the information of the binding (user1@domain1, IP2), the region locating server of the region 1 finds in its own records that the record of the user corresponding to the user identifier user1@domain1 is (user1@domain1, IP1), and then updates the record to be (user1@domain1, IP2).

Therefore, when another user in the network is to communicate with the user 1, the current communication address IP2 of the user can be obtained as long as the region locating server of the region 1 to which the user belongs is found. This address is used for communication with the user1.

An auto-detect address server in a Packet-based network according to an embodiment of the invention includes:

a snooping unit adapted to collect a neighbor request message carrying a user identifier of a user and a neighbor notification message over a link, to extract the user identifier and a test address in the neighbor request message, to snoop into the neighbor notification message reporting a confliction of the test address, and to send the extracted information to a locating information management unit and request for updating recorded information;

a locating information management unit adapted to receive a request from the snooping unit, to maintain information of the user identifier and the test address, and to bind and send the obtained user identifier and address to a communication unit;

a timing unit adapted to initiate timing with a predetermined duration; and a communication unit adapted to send the user identifier and address sent form the locating information management unit outward to an region locating server, wherein the locating information management unit deletes the pair of the user identifier and the test address from a maintained information table if the snooping unit receives the neighbor notification message sent from another user reporting a confliction of the test address before the timing with the predetermined duration expires, or the locating information management unit updates a status of the user identifier and the test address to indicate an obtained binding, and sends information of the binding to the region locating server through the communication unit, if the snooping unit receives no neighbor notification message sent from another user reporting a confliction of the test address after the timing with the predetermined duration expires.

An auto-detect address server in a Packet-based network according to another embodiment of the invention includes:

a request message snooping unit adapted to collect a neighbor request message carrying a user identifier of a user over a link;

an information extracting unit adapted to extract and record the user identifier and a test address in the message;

a timing unit adapted to initiate timing with a predetermined duration;

a neighbor notification message snooping unit adapted to collect a neighbor notification message sent by another user over the link reporting a confliction of the test address;

a record deleting unit adapted to delete the extracted record if the neighbor notification message snooping unit receives the neighbor notification message sent from another user reporting a confliction of the test address before the timing with the predetermined duration expires; and an information binding unit adapted to bind the recorded user identifier and test address of the user if no neighbor notification message sent from another user reporting a confliction of the test address is received after the timing with the predetermined duration expires, thereby obtaining corresponding information of the user identifier and the communication address of the user.

It shall be noted that the units of the auto-detect address server can be independent upon of each other, and can also be integrated and combined in various ways, descriptions of which will not be detailed here.

An region locating server in a Packet-based network according to an embodiment of the invention includes:

an information storage and update unit adapted to store and update information of binding of user identifiers and communication addresses of all network users belonging to a management region;

an information inquiring unit adapted to send corresponding information of binding to an inquirer upon reception of an inquiry request; and an information sending unit adapted to send information of binding of a user identifier and a communication address of a network user found not belonging to the present management region to a home management region of the network user.

It shall be noted that the units of the region locating server can be independent upon of each other, and can also be integrated and combined various ways, descriptions of which will not be detailed here.

A centralized address management server in a Packet-based network according to an embodiment of the invention includes:

a communication address allocation unit adapted to allocate centrally communication addresses to all network users within an administrative region and to record information of a user identifier reported by a network user when applying for an address;

an information storage unit adapted to bind and store information of the communication address allocated to the network user and the recorded corresponding user identifier; and an information passing unit adapted to pass the information of the binding to a region locating server in the network.

It shall be noted that the units of the centralized address management server can be independent of each other, and can also be integrated and combined in various manners, description of which is not detailed here.

The above are merely embodiments of the invention, but the claimed scope of the invention shall not be limited to these embodiments. Variations or substitutions which can readily occur to those skilled in the art in light of the technical disclosure of the invention shall be encompassed in the claimed scope of the invention. Accordingly, the claimed scope of the invention shall accord with the scope of the claims.

What is claimed is:

1. A system for tracking a location of a mobile node when the mobile node moves to a foreign region of a network from a home region of the network, comprising: an address management server in the foreign region, a first locating server in the foreign region and a second locating server in the home region;

the address management server in the foreign region configured to receive an address requesting message from the mobile node in the foreign region; allocate a new communication address for the mobile node; generate a binding message containing a user ID of the mobile node and the new communication address of the mobile node in the foreign region; and send the binding message to the first locating server; wherein the new communication address is different from an old communication address allocated to the mobile node for use in the home region;

the first locating server configured to receive the binding message; determine based on the user ID of the mobile node that the mobile node belongs to the home region;

and send the user ID and the new communication address of the mobile node to the second locating server in the home region; and the second locating server configured to receive the user ID and the new communication address of the mobile node from the first locating server; and store the user ID and the new communication address of the mobile node for responding to inquiries regarding the location of the mobile node.

2. The system according to claim 1, wherein the address requesting message contains the user ID of the mobile node.

3. The system according to claim 1, the address management server further configured to store the user ID and the new communication address of the mobile node.

4. The system according to claim 1, further comprising:

determining, by the second locating server, that the mobile node belongs to the home region prior to storing the user ID and the new communication address of the mobile node.

5. A method for tracking a location of a mobile node when the mobile node moves to a foreign region of a network from a home region of the network, comprising:

receiving, by an address management server in the foreign region, an address requesting message from the mobile node;

allocating, by the address management server, a new communication address for the mobile node; wherein the new communication address is different from an old communication address allocated to the mobile node for use in the home region;

generating, by the address management server, a binding message containing a user ID of the mobile node and the new communication address of the mobile node in the foreign region;

sending, by the address management server, the binding message to the first locating server;

receiving, by a first locating server in the foreign region, the binding message;

determining, by the first locating server based on the user ID of the mobile node, that the mobile node belongs to the home region; and sending, by the first locating server, the user ID and the new communication address of the mobile node to a second locating server in the home region.

6. The method according to claim 5, wherein the address requesting message contains the user ID of the mobile node.

7. The method according to claim 5, further comprising:

storing, by the address management server, the user ID and the new communication address of the mobile node.

8. The method according to claim 5, further comprising:

storing, by the second locating server, the user ID and the new communication address of the mobile node.

9. The method according to claim 8, further comprising:

determining, by the second locating server, that the mobile node belongs to the home region prior to step of storing.

* * * * *